United States Patent
Anchan et al.

(10) Patent No.: US 9,398,425 B2
(45) Date of Patent: Jul. 19, 2016

(54) GROUP COMMUNICATIONS OVER EVOLVED MULTIMEDIA BROADCAST/MULTICAST SERVICES

(71) Applicant: QUALCOMM Incorporated, San Diego, CA (US)

(72) Inventors: Kirankumar Anchan, San Diego, CA (US); Yih-Hao Lin, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 545 days.

(21) Appl. No.: 13/673,723

(22) Filed: Nov. 9, 2012

(65) Prior Publication Data
US 2013/0121226 A1    May 16, 2013

Related U.S. Application Data

(60) Provisional application No. 61/558,728, filed on Nov. 11, 2011.

(51) Int. Cl.
| | |
|---|---|
| *G08C 17/00* | (2006.01) |
| *H04W 4/06* | (2009.01) |
| *H04W 72/00* | (2009.01) |
| *H04W 72/12* | (2009.01) |
| *H04L 12/18* | (2006.01) |
| *H04W 52/02* | (2009.01) |

(52) U.S. Cl.
CPC ............ *H04W 4/06* (2013.01); *H04W 52/0219* (2013.01); *H04W 72/005* (2013.01); *H04W 72/121* (2013.01); *H04L 12/189* (2013.01); *H04W 52/0216* (2013.01); *H04W 52/0229* (2013.01); *Y02B 60/50* (2013.01)

(58) Field of Classification Search
None
See application file for complete search history.

(56) References Cited

U.S. PATENT DOCUMENTS

| 7,760,628 B2 * | 7/2010 | Suszko ............... H04W 76/046 370/230 |
| 8,804,546 B2 * | 8/2014 | Tenny et al. ................. 370/252 |
| 2011/0080859 A1 * | 4/2011 | Phan et al. .................... 370/312 |

(Continued)

FOREIGN PATENT DOCUMENTS

| JP | 2010118834 A | 5/2010 |
| WO | 2011023254 A1 | 3/2011 |

OTHER PUBLICATIONS

International Search Report and Written Opinion—PCT/US2012/064696—ISA/EPO—Mar. 5, 2013.

(Continued)

*Primary Examiner* — Mounir Moutaouakil

(57) ABSTRACT

The disclosure is directed to group communications over evolved multimedia broadcast/multicast services (E-MBMS). An embodiment identifies a schedule for an indicator on a broadcast/multicast medium of a first multicast media on a multicast flow, wherein the indicator is configured to identify a location of data on the broadcast/multicast medium and to identify a presence of the data on the multicast flow, binds application layer paging, an application layer wake up mechanism, or a power saving mechanism to the schedule for the indicator on the multicast flow, wakes from a sleep mode to monitor the indicator to determine availability of the first multicast media based on the indicator, tunes to the first multicast media if the first multicast media is available, and returns to the sleep mode, if the first multicast media is not available.

20 Claims, 11 Drawing Sheets

(56) References Cited

U.S. PATENT DOCUMENTS

| | | | |
|---|---|---|---|
| 2011/0243054 A1* | 10/2011 | Yi et al. ........................ | 370/312 |
| 2012/0033623 A1 | 2/2012 | Chu et al. | |
| 2012/0039228 A1 | 2/2012 | Wang et al. | |
| 2012/0087287 A1 | 4/2012 | Kim et al. | |
| 2012/0151028 A1* | 6/2012 | Lu et al. ........................ | 709/223 |
| 2012/0163204 A1 | 6/2012 | Oprescu-Surcobe et al. | |
| 2012/0163286 A1 | 6/2012 | Huschke et al. | |

OTHER PUBLICATIONS

ST-Ericsson, DSI for short sessions in LTE MBMS, 3GPP TSG-RAN WG2 #67bis R2-095790, Oct. 6, 2009.

* cited by examiner

GROUP COMMUNICATIONS OVER EVOLVED MULTIMEDIA BROADCAST/MULTICAST SERVICES

CLAIM OF PRIORITY

The present Application for Patent claims priority to Provisional Patent Application No. 61/558,728 entitled "GROUP COMMUNICATIONS OVER EVOLVED MULTIMEDIA BROADCAST/MULTICAST SERVICES" filed Nov. 11, 2011, pending, and assigned to the assignee hereof and hereby expressly incorporated by reference herein in its entirety.

FIELD OF DISCLOSURE

The present disclosure relates generally to communication, and more specifically to techniques for supporting group communications on broadcast and multicast services in a cellular communication system.

BACKGROUND

A cellular communication system can support bi-directional communication for multiple users by sharing the available system resources. Cellular systems are different from broadcast systems that can mainly or only support unidirectional transmission from broadcast stations to users. Cellular systems are widely deployed to provide various communication services and may be multiple-access systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc.

A cellular system may support broadcast, multicast, and unicast services. A broadcast service is a service that may be received by all users, e.g., news broadcast. A multicast service is a service that may be received by a group of users, e.g., a subscription video service. A unicast service is a service intended for a specific user, e.g., voice call. Group communications can be implemented using either unicast, broadcast, multicast or a combination of each. As the group becomes larger it is generally more efficient to use multicast services. However, for group communication services that require low latency and a short time to establish the group communication, the setup time of conventional multicast channels can be a detriment to system performance.

SUMMARY

The disclosure is directed to group communications over evolved multimedia broadcast/multicast services (E-MBMS). An embodiment identifies a schedule for an indicator on a broadcast/multicast medium of a first multicast media on a multicast flow, wherein the indicator is configured to identify a location of data on the broadcast/multicast medium and to identify a presence of the data on the multicast flow, binds application layer paging, an application layer wake up mechanism, or a power saving mechanism to the schedule for the indicator on the multicast flow, wakes from a sleep mode to monitor the indicator to determine availability of the first multicast media based on the indicator, tunes to the first multicast media if the first multicast media is available, and returns to the sleep mode, if the first multicast media is not available.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
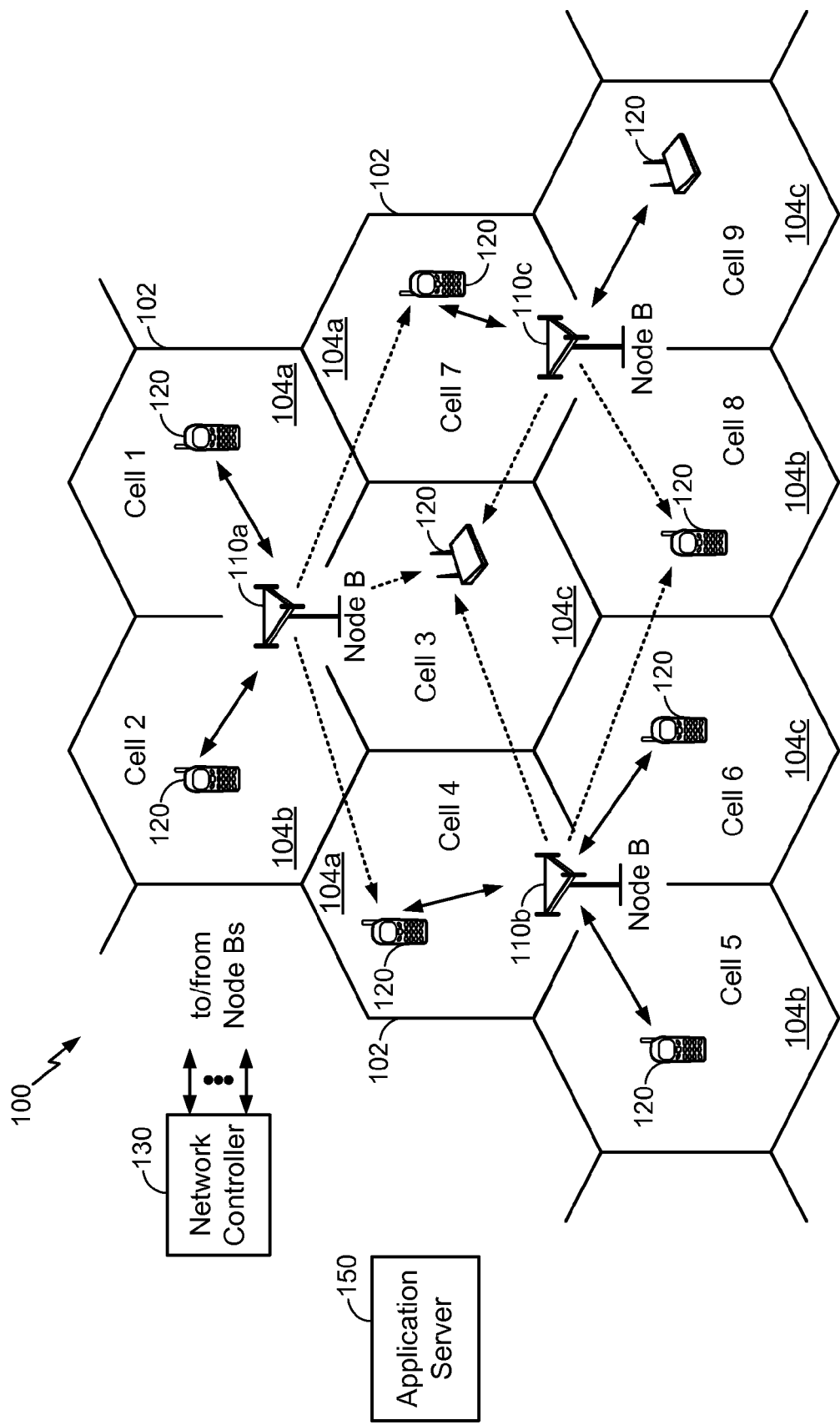
FIG. 1 illustrates a wireless communication system.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation. Further, as used herein the term group communication, push-to-talk, or similar variations are meant to refer to a server arbitrated service between two or more devices.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The techniques described herein may be used for various cellular communication systems such as CDMA, TDMA, FDMA, OFDMA and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink, UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

FIG. 1 shows a cellular communication system 100, which may be an LTE system. Cellular communication system 100 may include a number of Node Bs and other network entities. For simplicity, only three Node Bs 110a, 110b and 110c are shown in FIG. 1. A Node B may be a fixed station used for communicating with the user equipments (UEs) and may also be referred to as an evolved Node B (eNB), a base station, an access point, etc. Each Node B 110a-c (collectively Node B 110) provides communication coverage for a particular geographic area 102. To improve system capacity, the overall coverage area of a Node B may be partitioned into multiple smaller areas, e.g., three smaller areas 104a, 104b and 104c. Each smaller area may be served by a respective Node B subsystem. In 3GPP, the term "cell" can refer to the smallest coverage area of a Node B and/or a Node B subsystem serving this coverage area. In other systems, the term "sector" can refer to the smallest coverage area of a base station and/or a base station subsystem serving this coverage area. For clarity, 3GPP concept of a cell is used in the description below.

In the example shown in FIG. 1, each Node B 110 has three cells that cover different geographic areas. For simplicity, FIG. 1 shows the cells not overlapping one another. In a practical deployment, adjacent cells typically overlap one another at the edges, which may allow a UE to receive coverage from one or more cells at any location as the UE moves about the system.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via transmissions on the downlink and uplink. The downlink (or forward link) refers to the communication link from the Node B to the UE, and the uplink (or reverse link) refers to the communication link from the UE to the Node B. In FIG. 1, a solid line with double arrows indicates bi-directional communication between a Node B and a UE. A dashed line with a single arrow indicates a UE receiving a downlink signal from a Node B, e.g., for broadcast and/or multicast services. The terms "UE" and "user" are used interchangeably herein.

Network controller 130 may couple to multiple Node Bs to provide coordination and control for the Node Bs under its control, and to route data for terminals served by these Node Bs. Cellular communication system 100 may also include other network entities not shown in FIG. 1. Further, as illustrated network controller 130 may be operably coupled to an application server 150 to provide group communication services to the various UEs 120 through cellular communication system 100. It will be appreciated that there can be many other network and system entities that can be used to facilitate communications between the UEs and servers and information outside of the access network. Accordingly, the various embodiments disclosed herein are not limited to the specific arrangement or elements detailed in the various figures.

Figure 2:
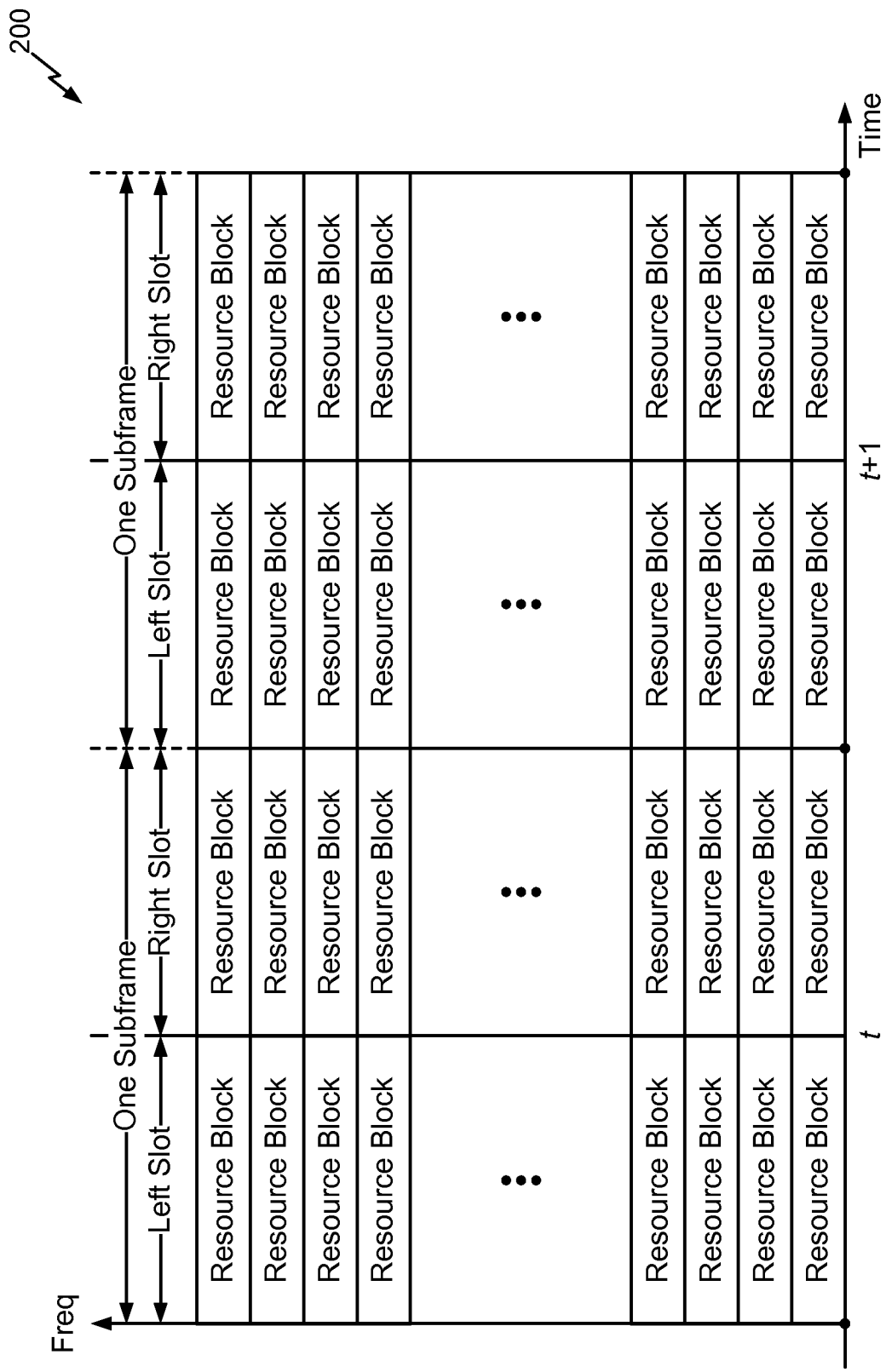
FIG. 2 illustrates an example transmission structure.

FIG. 2 shows an example transmission structure 200 that may be used for the downlink in cellular communication system 100. The transmission timeline may be partitioned into units of radio frames. Each radio frame may have a predetermined duration (e.g., 10 milliseconds (ms)) and may be partitioned into 10 sub frames. Each sub frame may include two slots, and each slot may include a fixed or configurable number of symbol periods, e.g., six or seven symbol periods.

The system bandwidth may be partitioned into multiple (K) subcarriers with orthogonal frequency division multiplexing (OFDM). The available time frequency resources may be divided into resource blocks. Each resource block may include Q subcarriers in one slot, where Q may be equal to 12 or some other value. The available resource blocks may be used to send data, overhead information, pilot, etc.

The system may support evolved multimedia broadcast/multicast services (E-MBMS) for multiple UEs as well as unicast services for individual UEs. A service for E-MBMS may be referred to as an E-MBMS service or flow and may be a broadcast service/flow or a multicast service/flow.

In LTE, data and overhead information are processed as logical channels at a Radio Link Control (RLC) layer. The logical channels are mapped to transport channels at a Medium Access Control (MAC) layer. The transport channels are mapped to physical channels at a physical layer (PHY). Table 1 lists some logical channels (denoted as "L"), transport channels (denoted as "T"), and physical channels (denoted as "P") used in LTE and provides a short description for each channel.

TABLE 1

| Name | Channel | Type | Description |
| --- | --- | --- | --- |
| Broadcast Control Channel | BCCH | L | Carry system information |
| Broadcast Channel | BCH | T | Carry master system Information |
| E-MBMS Traffic Channel | MTCH | L | Carry configuration information for E-MBMS services. |
| Multicast Channel | MCH | T | Carry the MTCH and MCCH |
| Downlink Shared Channel | DL-SCH | T | Carry the MTCH and other logical channels |
| Physical Broadcast Channel | PBCH | P | Carry basic system information for use in acquiring the system. |
| Physical Multicast Channel | PMCH | P | Carry the MCH. |
| Physical Downlink Shared Channel | PDSCH | P | Carry data for the DL-SCH |
| Physical Downlink Control Channel | PDCCH | P | Carry control information for the DL-SCH |

As shown in Table 1, different types of overhead information may be sent on different channels. Table 2 lists some types of overhead information and provides a short description for each type. Table 2 also gives the channel(s) on which each type of overhead information may be sent, in accordance with one design.

TABLE 2

| Overhead Information | Channel | Description |
| --- | --- | --- |
| System Information | BCCH | Information pertinent for communicating with and/or receiving data from the system. |
| Configuration Information | MCCH | Information used to receive the Information services, e.g., MBSFN Area Configuration, which contains PMCH configurations, Service ID, Session ID, etc. |
| Control Information | PDCCH | Information used to receive Information transmissions of data for the services, e.g., resource assignments, modulation and coding schemes, etc. |

The different types of overhead information may also be referred to by other names. The scheduling and control information may be dynamic whereas the system and configuration information may be semi-static.

The system may support multiple operational modes for E-MBMS, which may include a multi-cell mode and a single-cell mode. The multi-cell mode may have the following characteristics:
  Content for broadcast or multicast services can be transmitted synchronously across multiple cells.
  Radio resources for broadcast and multicast services are allocated by an MBMS Coordinating Entity (MCE), which may be logically located above the Node Bs.
  Content for broadcast and multicast services is mapped on the MCH at a Node B.
  Time division multiplexing (e.g., at sub frame level) of data for broadcast, multicast, and unicast services.

The single-cell mode may have the following characteristics:
  Each cell transmits content for broadcast and multicast services without synchronization with other cells.
  Radio resources for broadcast and multicast services are allocated by the Node B.
  Content for broadcast and multicast services is mapped on the DL-SCH.
  Data for broadcast, multicast, and unicast services may be multiplexed in any manner allowed by the structure of the DL-SCH.

In general, E-MBMS services may be supported with the multi-cell mode, the single-cell mode, and/or other modes. The multi-cell mode may be used for E-MBMS multicast/broadcast single frequency network (MBSFN) transmission, which may allow a UE to combine signals received from multiple cells in order to improve reception performance.

Figure 3:
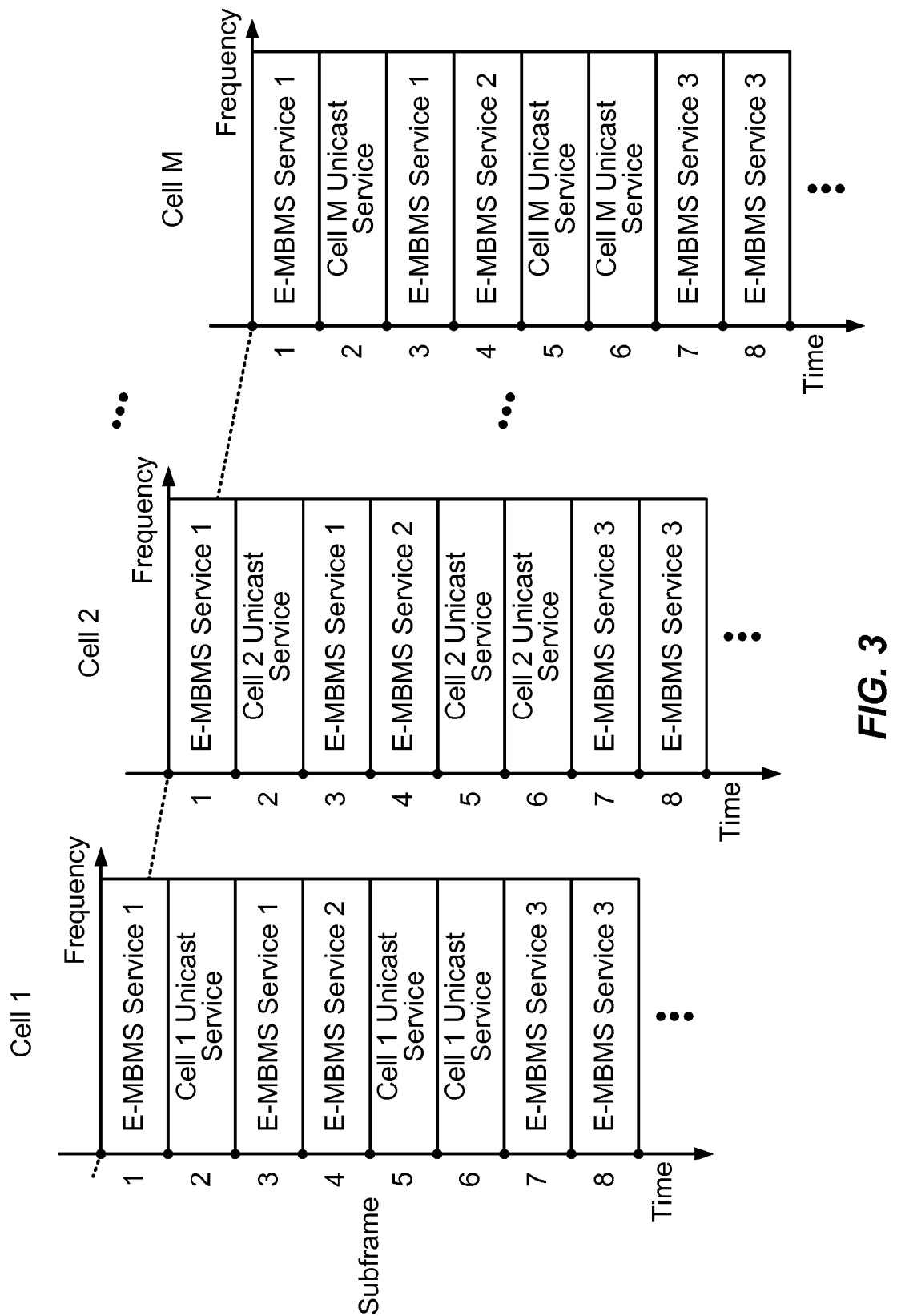
FIG. 3 illustrates example transmissions of different services in a multi-cell mode.

FIG. 3 shows example transmissions of E-MBMS and unicast services by M cells 1 through M in the multi-cell mode, where M may be any integer value. For each cell, the horizontal axis may represent time, and the vertical axis may represent frequency. In one design of E-MBMS, which is assumed for much of the description below, the transmission time line for each cell may be partitioned into time units of sub frames. In other designs of E-MBMS, the transmission time line for each cell may be partitioned into time units of other durations. In general, a time unit may correspond to a sub frame, a slot, a symbol period, multiple symbol periods, multiple slots, multiple sub frames, etc.

In the example shown in FIG. 3, the M cells transmit three E-MBMS services 1, 2 and 3. All M cells transmit E-MBMS service 1 in sub frames 1 and 3, E-MBMS service 2 in sub frame 4, and E-MBMS service 3 in sub frames 7 and 8. The M cells transmit the same content for each of the three E-MBMS services. Each cell may transmit its own unicast service in sub frames 2, 5 and 6. The M cells may transmit different contents for their unicast services.

Figure 4:
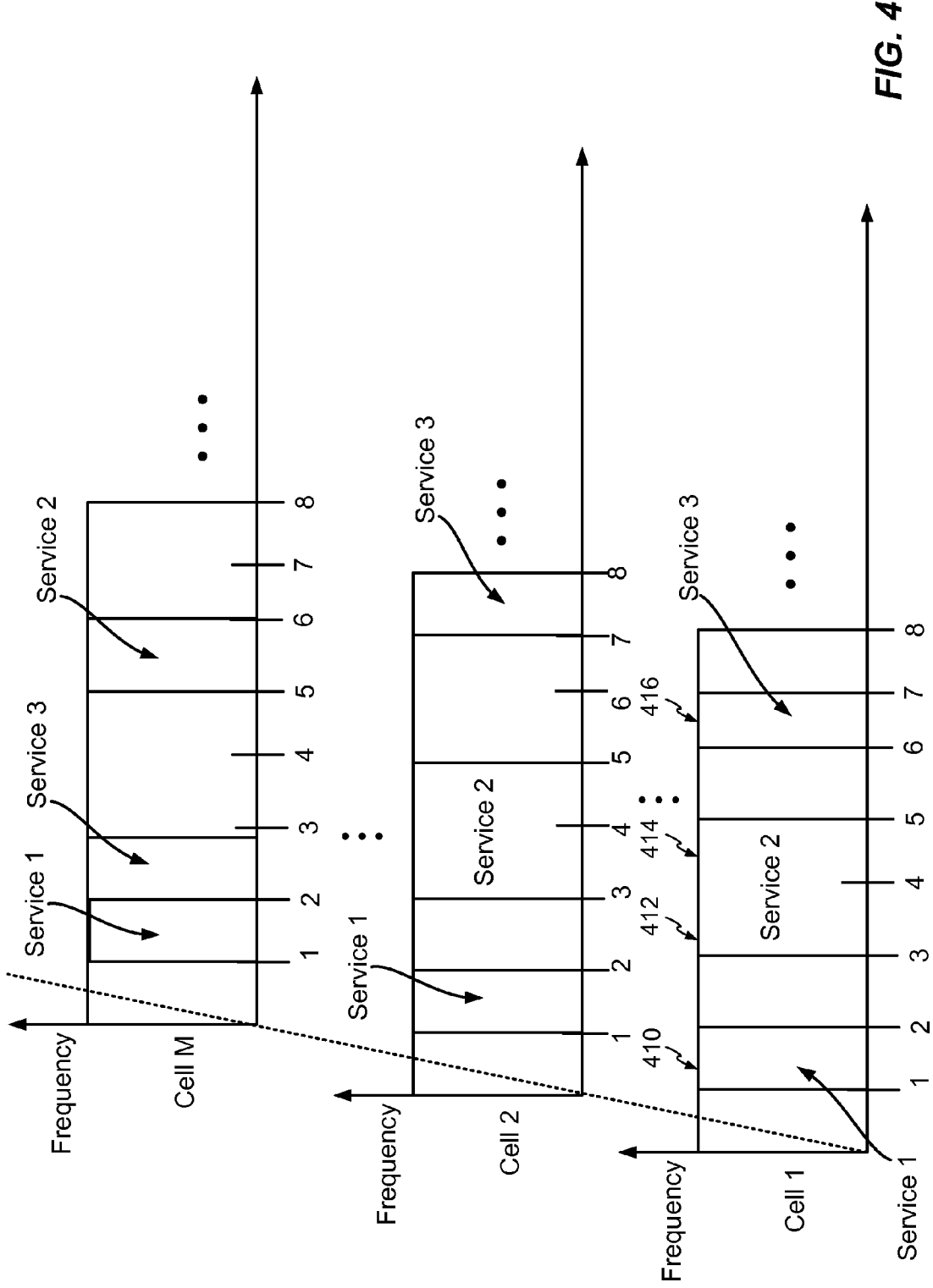
FIG. 4 illustrates example transmissions of different services in a single-cell mode.

FIG. 4 shows example transmissions of E-MBMS and unicast services by M cells in the single-cell mode. For each cell, the horizontal axis may represent time, and the vertical axis may represent frequency. In the example shown in FIG. 4, the M cells transmit three E-MBMS services 1, 2 and 3. Cell 1 transmits E-MBMS service 1 in one time frequency block 410, E-MBMS service 2 in a time frequency blocks 412 and 414, and E-MBMS service 3 in one time frequency blocks 416. Similarly other cells transmit services 1, 2 and 3 as shown in the FIG. 4.

In general, an E-MBMS service may be sent in any number of time frequency blocks. The number of sub frames may be dependent on the amount of data to send and possibly other factors. The M cells may transmit the three E-MBMS services 1, 2 and 3 in time frequency blocks that may not be aligned in time and frequency, as shown in FIG. 4. Furthermore, the M cells may transmit the same or different contents for the three E-MBMS services. Each cell may transmit its own unicast service in remaining time frequency resources not used for the three E-MBMS services. The M cells may transmit different contents for their unicast services.

FIGS. 3 and 4 show example designs of transmitting E-MBMS services in the multi-cell mode and the single-cell mode. E-MBMS services may also be transmitted in other manners in the multi-cell and single-cell modes, e.g., using time division multiplexing (TDM).

As noted in the foregoing, E-MBMS services can be used to distribute multicast data to groups and could be useful in group communication systems (e.g., Push-to-Talk (PTT) calls). Conventional applications on E-MBMS have a separate service announcement/discovery mechanism. Further, communications on pre-established E-MBMS flows are always-on, even on the air interface. Power saving optimization must be applied to put the UE to sleep when a call/communication is not in progress. This is typically achieved by using out of band service announcements on unicast or multicast user plane data. Alternatively, an application layer paging channel like mechanism may be used. Since the application layer paging mechanism has to remain active, it consumes bandwidth on the multicast sub-frame, which could be idle in the absence of the application layer paging mechanism. Additionally, since the multicast sub-frame will be active while using the application layer paging mechanism, the remainder of the resource blocks within the sub frame cannot be used for unicast traffic. Thus, the total 5 MHz bandwidth will be consumed for the sub frame for instances when application layer paging is scheduled without any other data.

Figure 5A:
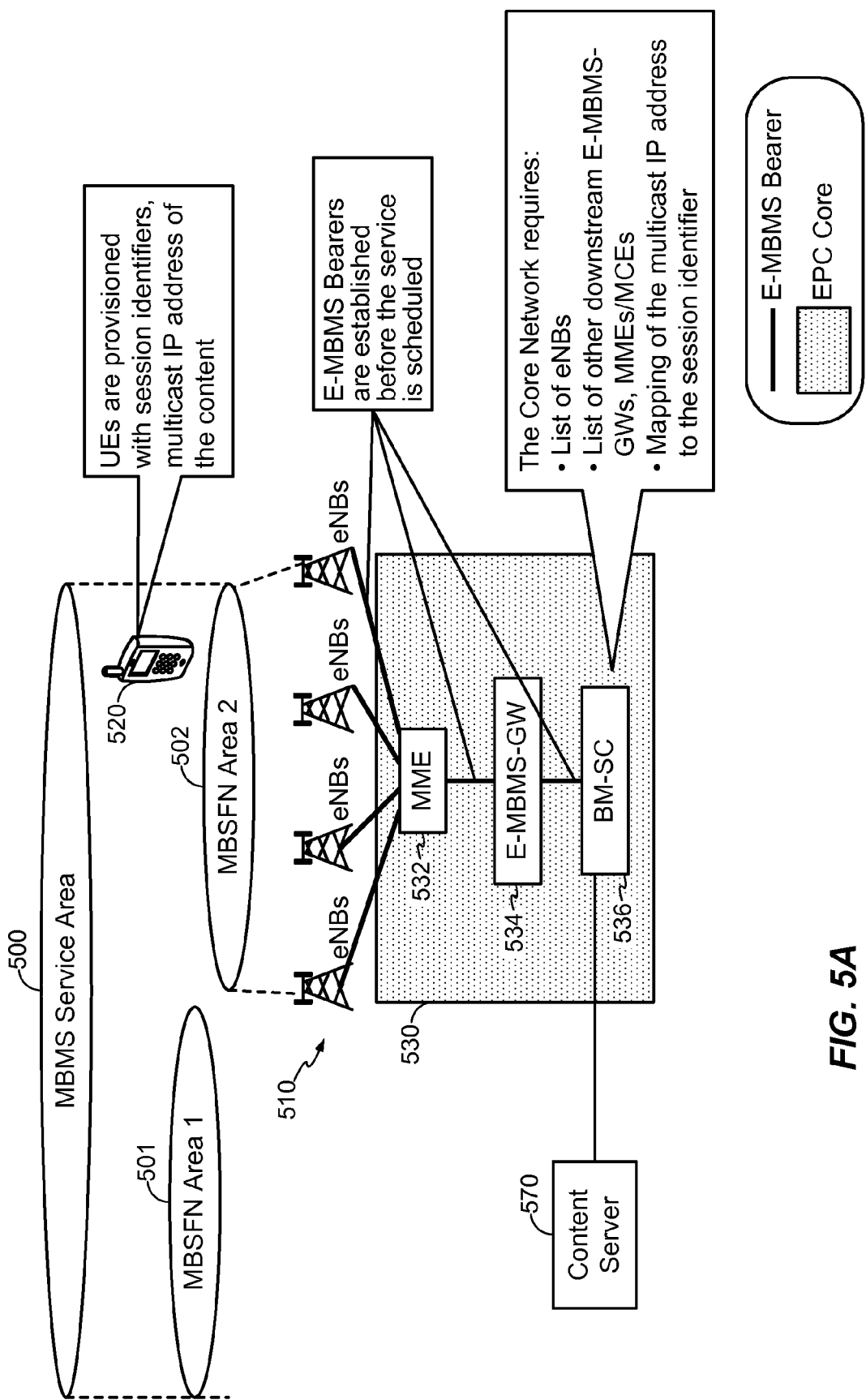
FIGS. 5A and 5B illustrate additional wireless communication systems that can support broadcast/multicast services.

FIG. 5A is another illustration of a wireless network that can implement evolved multimedia broadcast/multicast services (E-MBMS) or MBMS services, which are used interchangeably herein. An MBMS service area 500 can include multiple MBSFN areas (e.g. MBSFN area 1, 501 and MBSFN area 2, 502). Each MBSFN area can be supported by one or more eNode Bs 510, which are coupled to a core network 530. Core network 530 can include various elements (e.g., MME 532, E-MBMS gateway 534, and broadcast multicast service center (BM-SC) 536 to facilitate controlling and distributing the content from content provider 570 (which may include an application server, etc.) to the MBMS service area 500.

Figure 5B:
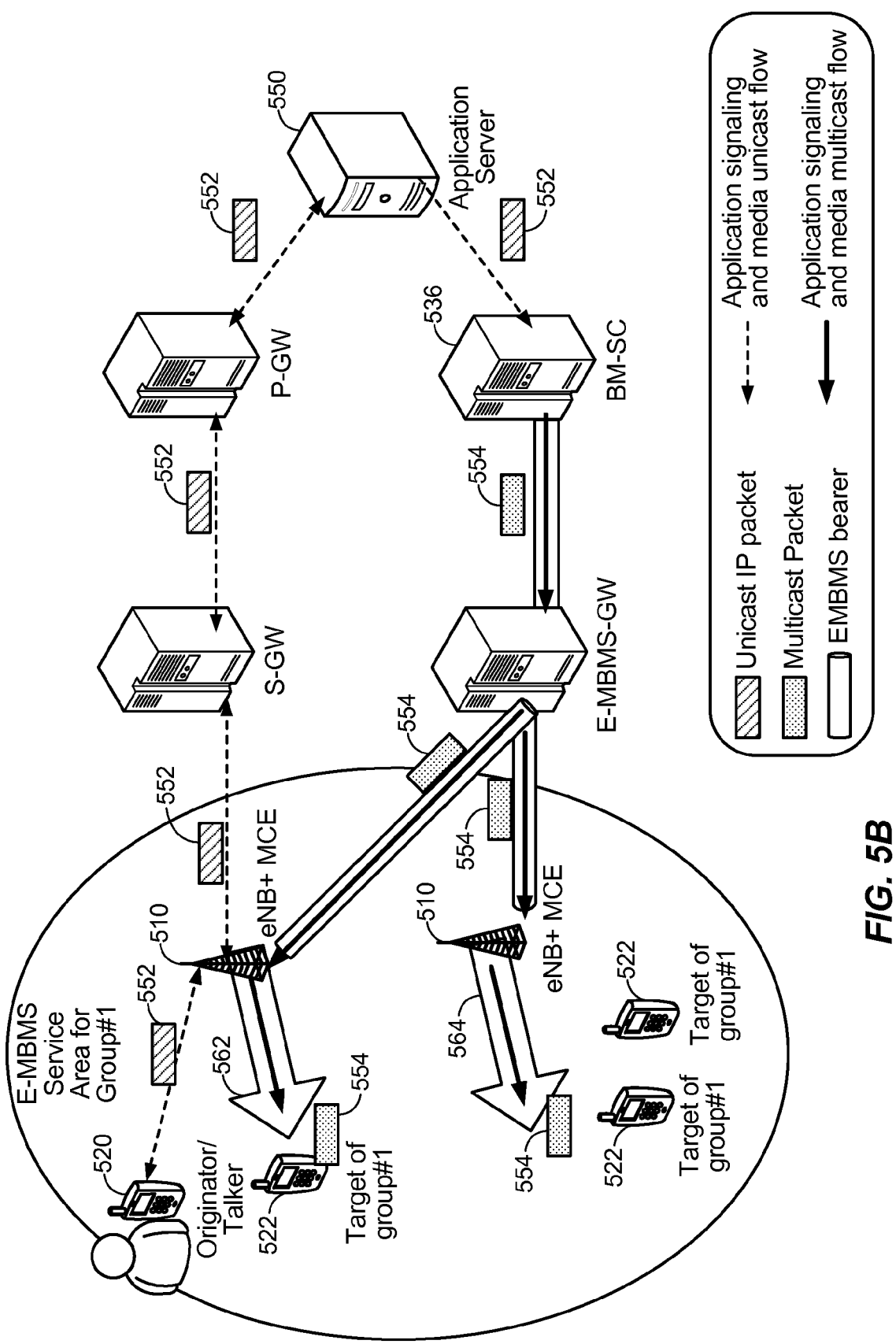

FIG. 5B is another illustration of a wireless network that can implement multimedia broadcast/multicast services (MBMS) as disclosed herein. In the illustrated network, an application server 550 (e.g., PTT server) can serve as the content server. The application server 550 can communicate media in unicast packets 552 to the network core where the content can be maintained in a unicast configuration and transmitted as unicast packets to a given UE (e.g., originator/talker 520) or the content can be converted through the BM-SC to multicast packets 554, which can then be transported target UE's 522. For example, a PTT call can be initiated by originator UE 520 by communicating with application server 550 via unicast packets 552 over a unicast channel. It will be noted that for the call originator/call talker 520, both the application signaling and media are communicated via the unicast channel on the uplink or the reverse link. The application server 550 can then generate a call announce/call setup request and communicate these to the target UEs 522. The communication can be communicated to the target UEs 522 via multicast packets 554 over a multicast flow, as illustrated in this particular example. Further, it will be appreciated that in this example, both the application signaling and media can be communicated over the multicast flow in the downlink or the forward link. Unlike conventional systems, having both the application signaling and the media in the multicast flow avoids the need of having a separate unicast channel for the application signaling. However, to allow for application signaling over the multicast flow of the illustrated system, an evolved packet system (EPS) bearer will be established (and persistently on) between the BM-SC 536, EMBS GW 534, eNBs 510 and target UEs 522.

In accordance with various embodiments disclosed herein some of the downlink channels related to E-MBMS will be further discussed, which include.

MCCH: Multicast Control Channel;
MTCH: Multicast Traffic Channel;
MCH: Multicast Channel; and
PMCH: Physical Multicast Channel.

It will be appreciated that multiplexing of E-MBMS and unicast flows are realized in the time domain only. The MCH is transmitted over MBSFN in specific sub frames on physical layer. MCH is a downlink only channel. A single transport block is used per sub frame. Different services (MTCHs) can be multiplexed in this transport block, as will be illustrated in relation to FIG. 6.

To achieve low latency and reduce control signaling, one E-MBMS flow (562, 564) can be activated for each service area. Depending on the data rate, multiple multicast flows can be multiplexed on a single slot. PTT UEs (targets) can ignore and "sleep" between scheduled sub frames and reduce power consumption when no unicast data is scheduled for the UE. The MBSFN sub frame can be shared by groups in the same MBSFN service area. MAC layer signaling can be leveraged to "wake-up" the application layer (e.g., PTT application) for the target UEs.

Embodiments can use two broadcast streams, each a separate E-MBMS flow over an LTE broadcast flow, with its own application level broadcast stream and its own (multicast IP address) for each defined broadcast region 502, 501 (e.g., a subset of sectors within the network). Although illustrated as separate regions, it will be appreciated that the broadcast areas 502, 501 may overlap.

In LTE, the control and data traffic for multicast is delivered over MCCH and MTCH, respectively. The Medium Access Control Protocol Data Units (MAC PDUs) for the UEs indicate the mapping of the MTCH and the location of a particular MTCH within a sub frame. An MCH Scheduling Information (MSI) MAC control element is included in the first subframe allocated to the MCH within the MCH scheduling period to indicate the position of each MTCH and unused subframes on the MCH. For E-MBMS user data, which is carried by the MTCH logical channel, MCH scheduling information (MSI) periodically provides at lower layers (e.g., MAC layer information) the information on decoding the MTCH. The MSI scheduling can be configured and according to this embodiment is scheduled prior to MTCH sub-frame interval. Thus, the UEs can check the MCH MAC PDU on every MSI and determine if data is available for its MTCH. If the UE determines that data is not available for its MTCH, the UE can go back to sleep and monitor the MBSFN sub frame again in the next MSI. So when the sub frames are idle, the UE can remain in sleep and conserve power. An illustration of this is provided in FIG. 6A and FIG. 6B.

Figure 6A:
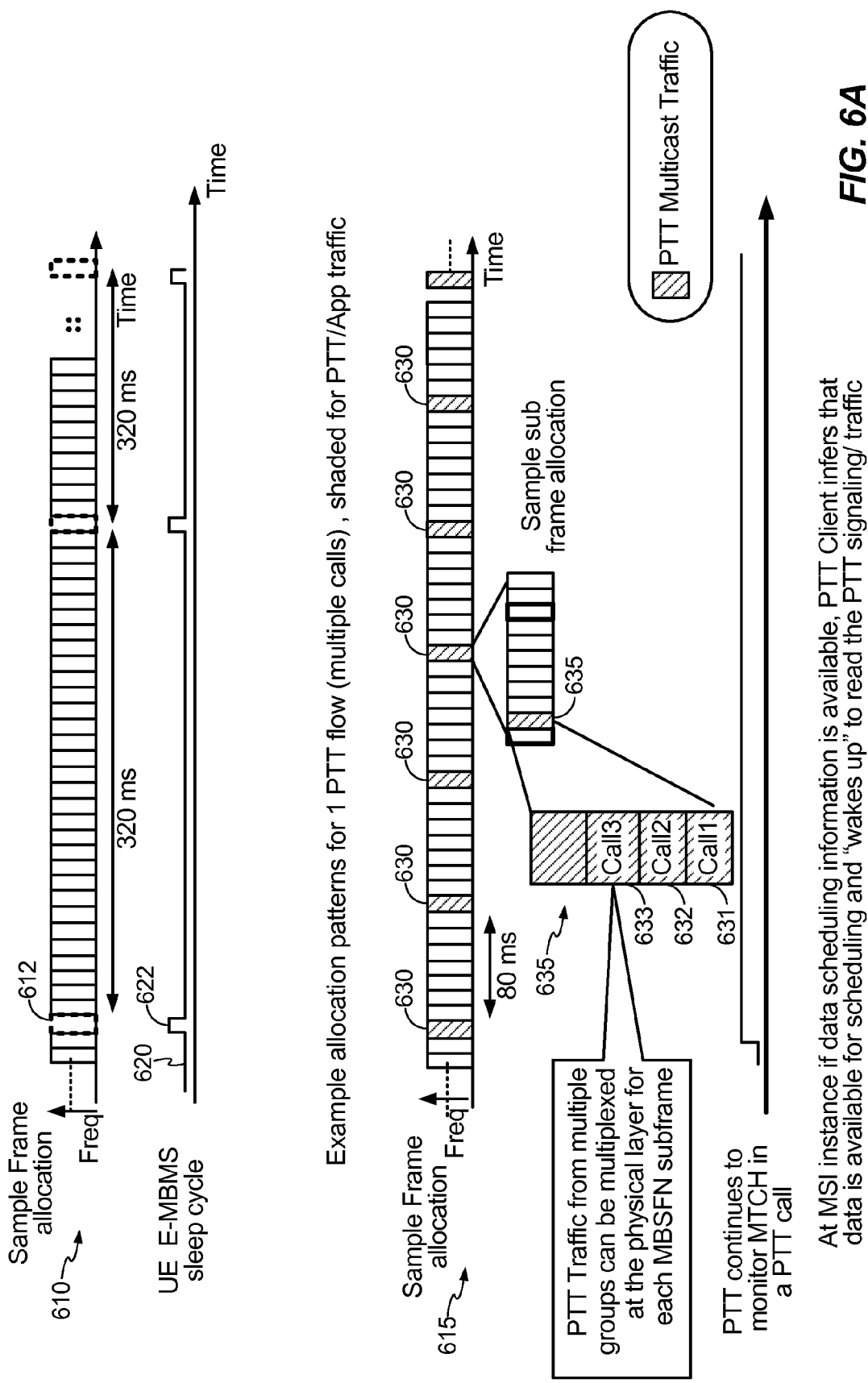
FIG. 6A illustrates block diagrams of the various flows between an application server and various UEs.

Referring to FIG. 6A, an example of a PTT call over E-MBMS is provided, however, it will be appreciated that any application media can be used in various embodiments. Referring back to the example, a PTT UE can have a sleep cycle 620 where it wakes up every MSI interval 622 (MCH scheduling Information interval) to check for E-MBMS multicast PTT traffic (information about MTCH logical channel) which is contained in frames 610 transmitted to the UE. The interval is 320 ms in the illustrated example. When no data traffic is present as indicated by the MSI 612, the PTT UE infers that no PTT data traffic is scheduled. Thus, the PTT UE can continue to remain in the sleep state or low power mode.

Note, per the LTE standard, the PTT UE may still wake up for unicast traffic, which is independent of the E-MBMS traffic/sleep cycle illustrated.

Upon entering an E-MBMS service area, the PTT UE can check the SIB 1 message to obtain specific information available on SIB 13 message for the MCCH schedule. Accordingly, the PTT UE can use the MCCH schedule information to identify the MSI scheduling (e.g., 320 ms). The PTT UE can check the Medium Access Control Protocol Data Units (MAC PDUs) for MSI information. When the PTT UE determines E-MBMS data is available, the PTT UE "wakes up" to read the PTT signaling/traffic. For example, flow 615 illustrates an example allocation pattern 630 which occurs at an 80 ms interval for 1 PTT flow in sub frame 635 (which can include traffic 631, 632, 633 from multiple calls). As illustrated, traffic 631, 632, 633 from multiple groups (e.g., Call 1, Call 2, Call 3) or from the same call but belonging to the media and signaling can be multiplexed at the application layer.

After the first sub-frame in the scheduling interval, the multicast sub frames allocated to the MBSFN area will be empty/idle when no PTT traffic is scheduled. This allows the MME+eNB to schedule unicast traffic during the MBSFN sub frame thus reutilizing the idle slot. This provides a significant bandwidth savings over systems that have application layer paging where low bandwidth application layer paging data prevents the E-MBMS sub frame from being used for unicast traffic. Further, the additional overhead of application layer paging processing is not needed on the PTT UE, since the PTT UE can determine if there is a PTT call based on the MSI, as discussed in the foregoing. Additionally, eliminating the application layer paging stream allows one additional multicast call to be multiplexed on the same sub-frame as a result of the bandwidth savings.

Figure 6B:
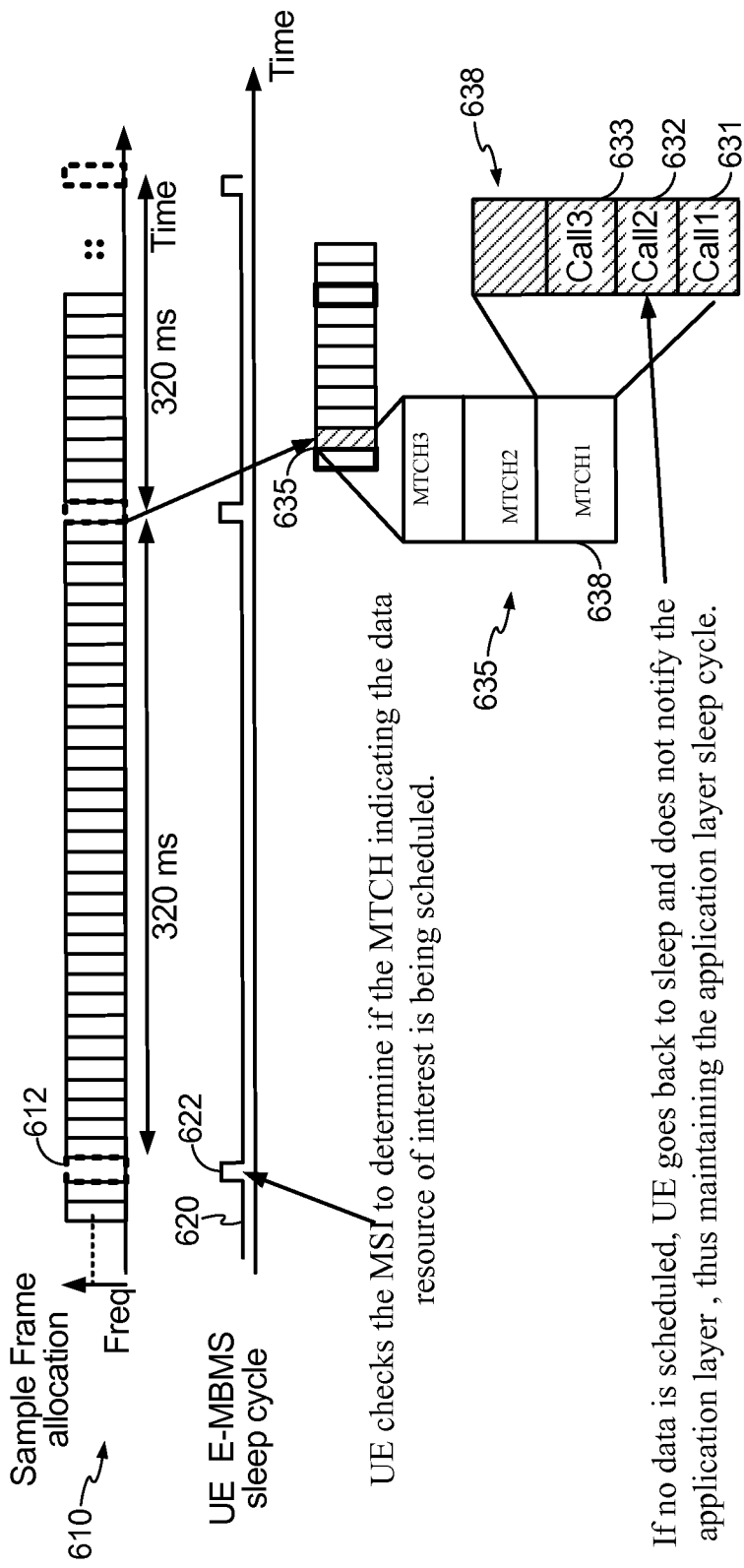
FIG. 6B illustrates block diagrams of the various flows between an application server and various UEs.

Referring to FIG. 6B, a further example of a PTT call over E-MBMS is provided, however, it will be appreciated that any application media can be used in various embodiments. As illustrated, at 622, the UE checks the MSI to determine one of the MTCH (e.g., MTCH1, 638) is indicating the data resource of interest is being scheduled. If no data is scheduled, the UE goes back to sleep and does not notify the application layer, thus maintaining the application layer sleep cycle. However, if data is scheduled, the UE notifies the application layer. Since in some embodiments there may be multiple application layer streams multiplexed (e.g., 631, 632, 633) over a single MTCH, 638, the application can make a determination on presence of an interested stream and decide on the application layer sleep cycle.

Figure 7:
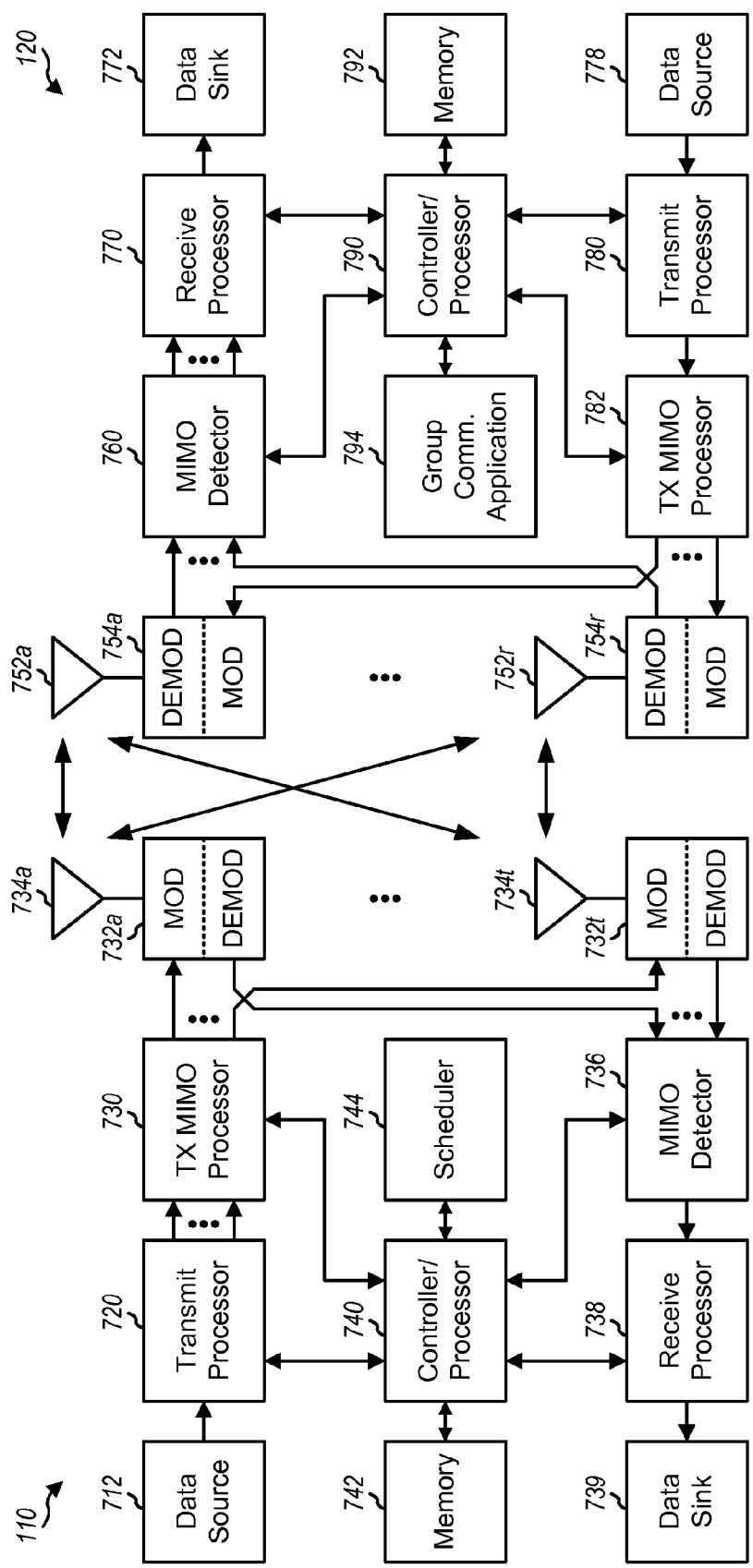
FIG. 7 shows a block diagram of a Node B and a UE.

FIG. 7 illustrates a block diagram of a design of an eNode B 110 and UE 120, which may be one of the eNode Bs and one of the UEs discussed herein in relation to the various embodiments. In this design, Node B 110 is equipped with T antennas 734*a* through 734*t*, and UE 120 is equipped with R antennas 752*a* through 752*r*, where in general T is greater than or equal to 1 and R is greater than or equal to 1.

At Node B 110, a transmit processor 720 may receive data for unicast services and data for broadcast and/or multicast services from a data source 712 (e.g., directly or indirectly from application server 150). Transmit processor 720 may process the data for each service to obtain data symbols. Transmit processor 720 may also receive scheduling information, configuration information, control information, system information and/or other overhead information from a controller/processor 740 and/or a scheduler 744. Transmit processor 720 may process the received overhead information and provide overhead symbols. A transmit (TX) multiple-input multiple-output (MIMO) processor 730 may multiplex the data and overhead symbols with pilot symbols, process (e.g., precode) the multiplexed symbols, and provide T output symbol streams to T modulators (MOD) 732*a* through 732*t*. Each modulator 732 may process a respective output symbol stream (e.g., for OFDM) to obtain an output sample stream. Each modulator 732 may further process (e.g., convert to analog, amplify, filter, and upconvert) the output sample stream to obtain a downlink signal. T downlink signals from modulators 732*a* through 732*t* may be transmitted via T antennas 734*a* through 734*t*, respectively.

At UE 120, antennas 752*a* through 752*r* may receive the downlink signals from Node B 110 and provide received signals to demodulators (DEMOD) 754*a* through 754*r*, respectively. Each demodulator 754 may condition (e.g., filter, amplify, downconvert, and digitize) a respective received signal to obtain received samples and may further process the received samples (e.g., for OFDM) to obtain received symbols. A MIMO detector 760 may receive and process the received symbols from all R demodulators 754*a* through 754*r* and provide detected symbols. A receive processor 770 may process the detected symbols, provide decoded data for UE 120 and/or desired services to a data sink 772, and provide decoded overhead information to a controller/processor 790. In general, the processing by MIMO detector 760 and receive processor 770 is complementary to the processing by TX MIMO processor 730 and transmit processor 720 at Node B 110.

On the uplink, at UE 120, data from a data source 778 and overhead information from a controller/processor 790 may be processed by a transmit processor 780, further processed by a TX MIMO processor 782 (if applicable), conditioned by modulators 754*a* through 754*r*, and transmitted via antennas 752*a* through 752*r*. At Node B 110, the uplink signals from UE 120 may be received by antennas 734, conditioned by demodulators 732, detected by a MIMO detector 736, and processed by a receive processor 738, coupled to data sink 739, to obtain the data and overhead information transmitted by UE 120.

Controllers/processors 740 and 790 may direct the operation at Node B 110 and UE 120, respectively. Controller/processor 740 may implement processes for the techniques described herein. Memories 742 and 792 may store data and program codes for Node B 110 and UE 120, respectively. In one embodiment, a group communication application 794 may operate in cooperation with the various processors and other components of the UE 120 to monitor the periodically monitor the E-MBMS flow for an indication of media, without separate unicast paging. No changes are required to conventional LTE paging or media flows. Accordingly, group communications in the E-MBMS environment can be accomplished in accordance with the various embodiments disclosed herein, while still remaining compliant with the existing standards.

Scheduler 744 may schedule UEs for downlink and/or uplink transmission, schedule transmission of broadcast and multicast services, and provide assignments of radio resources for the scheduled UEs and services. Controller/processor 740 and/or scheduler 744 may generate scheduling information and/or other overhead information for the broadcast and multicast services.

Figure 8:
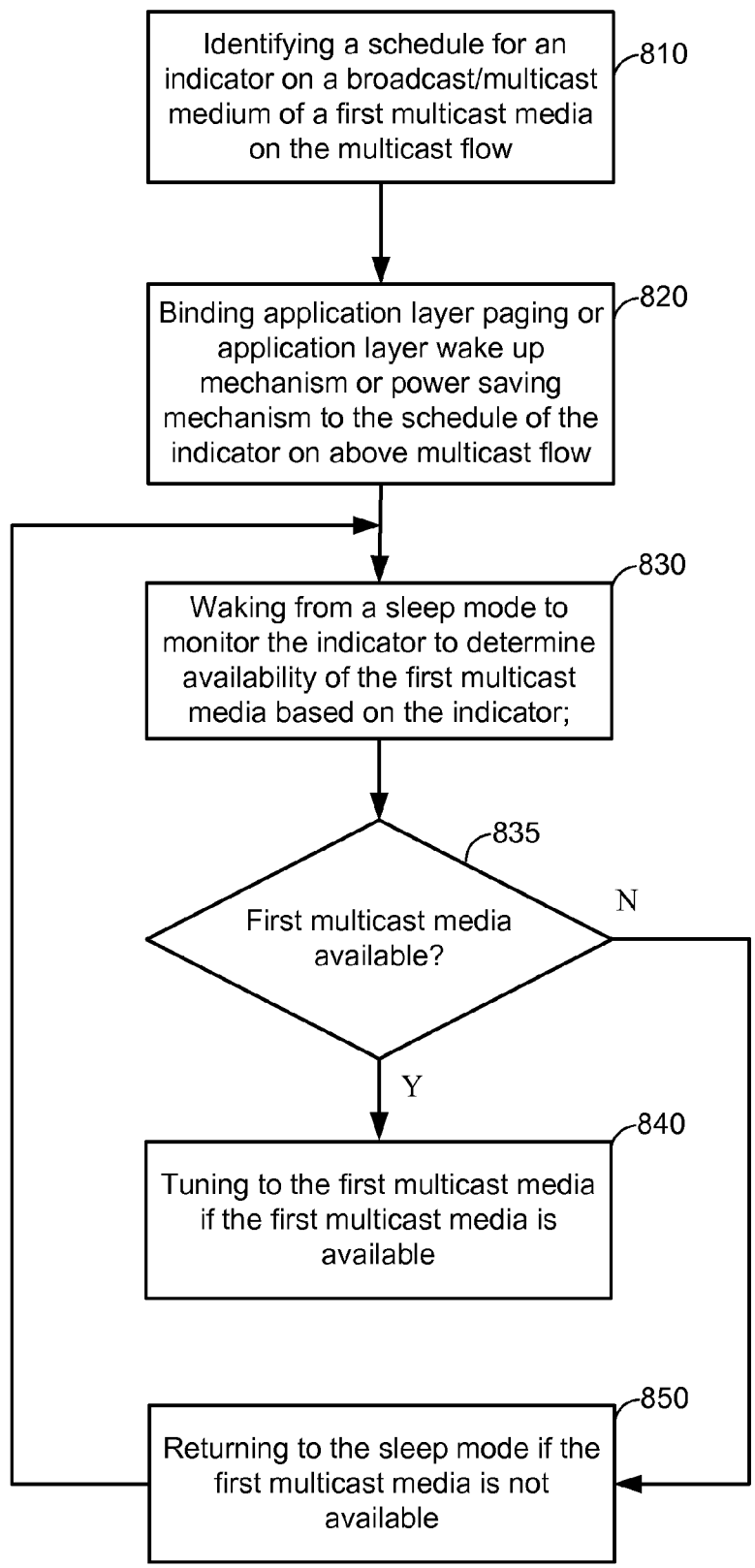
FIG. 8 illustrates an exemplary method for group communications over evolved multimedia broadcast/multicast services according to an embodiment.

In view of the foregoing, it will be appreciated that the various embodiments include methods and apparatuses for group communications over evolved multimedia broadcast/multicast services as disclosed herein. For example, referring to FIG. 8, a schedule for an indicator (e.g., MSI, 622) on broadcast/multicast medium of a first multicast media (e.g., MTCH1, 638) on the multicast flow (e.g., 635) can be identified, 810. The indicator is configured to identify a location of data on the broadcast/multicast medium and to identify a presence of the data on the multicast flow. Application layer paging, an application layer wake up mechanism or power saving mechanism is bound to the schedule of the indicator on the multicast flow, 820. The UE wakes from a sleep mode to monitor the indicator to determine availability of the first multicast media based on the indicator, 830. The first multicast media is tuned to, 840, if the first multicast media is available, 835. If the first multicast media is not available, 835, the UE returns to the sleep mode, 850. Once again it will be appreciated, as disclosed herein that in some embodiments there may be multiple application layer streams multiplexed (e.g., 631, 632, 633) over a single MTCH, the application can make a determination on presence of an interested stream (first multicast media, second multicast media, etc.) and decide on the application layer sleep cycle based on the presence of one or more streams.

Figure 9:
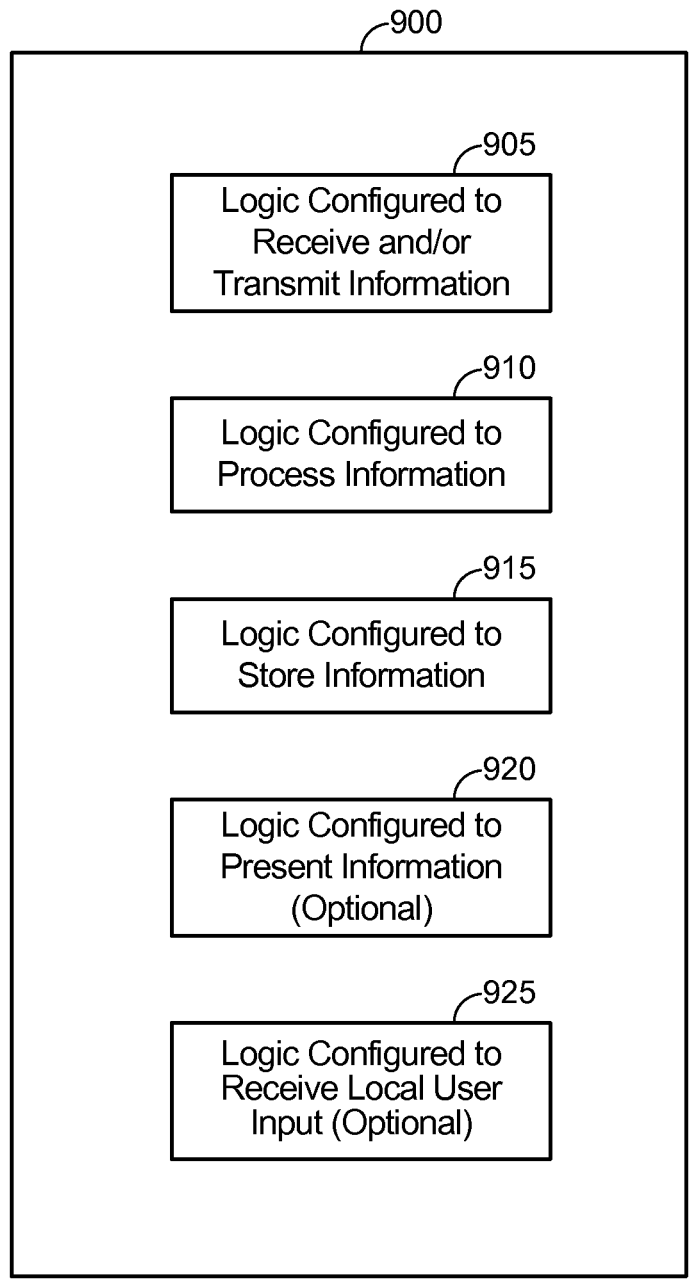
FIG. 9 illustrates a communication device that includes logic configured to perform functionality in accordance with an embodiment of the invention.

FIG. 9 illustrates a communication device 900 that includes logic configured to perform functionality. The communication device 900 can correspond to any of the above-noted communication devices, including but not limited to UEs 120, 520, and/or 522, eNBs 110 and/or 510, MME 532, E-MBMS-GW 534, BM-SC 536, application server 150, and so on. Thus, communication device 900 can correspond to any electronic device that is configured to communicate with (or facilitate communication with) one or more other entities over the wireless communications system 100 of FIG. 1.

Referring to FIG. 9, the communication device 900 includes logic configured to receive and/or transmit information 905. In an example, if the communication device 900 corresponds to a wireless communications device, the logic configured to receive and/or transmit information 905 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 905 can correspond to a wired communications interface (e.g., a serial connection, a USB or Firewire connection, an Ethernet connection, etc.). Thus, if the communication device 900 corresponds to some type of network-based server, the logic configured to receive and/or transmit information 905 can correspond to an Ethernet card, in an example, that connects the network-based server to other communication entities via an Ethernet protocol. In a further example, the logic configured to receive and/or transmit information 905 can include sensory or measurement hardware by which the communication device 900 can monitor its local environment (e.g., an accelerometer, a temperature sensor, a light sensor, an antenna for monitoring local RF signals, etc.). The logic configured to receive and/or transmit information 905 can also include software that, when executed, permits the associated hardware of the logic configured to receive and/or transmit information 905 to perform its reception and/or transmission function(s). However, the logic configured to receive and/or transmit information 905 does not correspond to software alone, and the logic configured to receive and/or transmit information 905 relies at least in part upon hardware to achieve its functionality.

Referring to FIG. 9, the communication device 900 further includes logic configured to process information 910. In an example, the logic configured to process information 910 can include at least a processor. Example implementations of the type of processing that can be performed by the logic configured to process information 910 includes but is not limited to performing determinations, establishing connections, making selections between different information options, performing evaluations related to data, interacting with sensors coupled to the communication device 900 to perform measurement operations, converting information from one format to another (e.g., between different protocols such as .wmv to .avi, etc.), and so on. For example, the processor included in the logic configured to process information 910 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 910 can also include software that, when executed, permits the associated hardware of the logic configured to process information 910 to perform its processing function(s). However, the logic configured to process information 910 does not correspond to software alone, and the logic configured to process information 910 relies at least in part upon hardware to achieve its functionality.

Referring to FIG. 9, the communication device 900 further includes logic configured to store information 915. In an example, the logic configured to store information 915 can include at least a non-transitory memory and associated hardware (e.g., a memory controller, etc.). For example, the non-transitory memory included in the logic configured to store information 915 can correspond to RAM, flash memory, ROM, EPROM memory, EEPROM memory, registers, hard disk, a removable disk, a CD-ROM, or any other form of storage medium known in the art. The logic configured to store information 915 can also include software that, when executed, permits the associated hardware of the logic configured to store information 915 to perform its storage function(s). However, the logic configured to store information 915 does not correspond to software alone, and the logic configured to store information 915 relies at least in part upon hardware to achieve its functionality.

Referring to FIG. 9, the communication device 900 further optionally includes logic configured to present information 920. In an example, the logic configured to present information 920 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 900. The logic configured to present information 920 can be omitted for certain communication devices, such as network communication devices that do not have a local user (e.g., network switches or routers, remote servers, etc.). The logic configured to present information 920 can also include software that, when executed, permits the associated hardware of the logic configured to present information 920 to perform its presentation function(s). However, the logic configured to present information 920 does not correspond to software alone, and the logic configured to present information 920 relies at least in part upon hardware to achieve its functionality.

Referring to FIG. 9, the communication device 900 further optionally includes logic configured to receive local user input 925. In an example, the logic configured to receive local user input 925 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 900. The logic configured to receive local user input 925 can be omitted for certain communication devices, such as network communication devices that do not have a local user (e.g., network switches or routers, remote servers, etc.). The logic configured to receive local user input 925 can also include software that, when executed, permits the associated hardware of the logic configured to receive local user input 925 to perform its input reception function(s). However, the logic configured to receive local user input 925 does not correspond to software alone, and the logic configured to receive local user input 925 relies at least in part upon hardware to achieve its functionality.

Referring to FIG. 9, while the configured logics of 905 through 925 are shown as separate or distinct blocks in FIG. 9, it will be appreciated that the hardware and/or software by which the respective configured logic performs its functionality can overlap in part. For example, any software used to facilitate the functionality of the configured logics of 905 through 925 can be stored in the non-transitory memory associated with the logic configured to store information 915, such that the configured logics of 905 through 925 each performs their functionality (i.e., in this case, software execution) based in part upon the operation of software stored by the logic configured to store information 915. Likewise, hardware that is directly associated with one of the configured logics can be borrowed or used by other configured logics from time to time. For example, the processor of the logic configured to process information 910 can format data into an appropriate format before being transmitted by the logic configured to receive and/or transmit information 905, such that the logic configured to receive and/or transmit information 905 performs its functionality (i.e., in this case, transmission of data) based in part upon the operation of hardware (i.e., the processor) associated with the logic configured to process information 910.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for group communications over evolved multimedia broadcast/multicast services (E-MBMS). Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for group communications over evolved multimedia broadcast/multicast services (E-MBMS) comprising:
   identifying a schedule for an indicator on a broadcast/multicast medium of a first multicast media on a multicast flow, wherein the indicator is configured to identify a location of data on the broadcast/multicast medium and to identify a presence of the data on the multicast flow;
   binding application layer paging, an application layer wake up mechanism, or a power saving mechanism to the schedule for the indicator on the multicast flow;
   waking from a sleep mode to monitor the indicator to determine availability of the first multicast media based on the indicator, while maintaining an application layer sleep cycle;
   notifying the application layer and tuning to the first multicast media if the first multicast media is available; and
   returning to the sleep mode without notifying the application layer to maintain the application layer sleep cycle if the first multicast media is not available.

2. The method of claim 1, wherein media and signaling data for the first multicast media is multiplexed at the application layer and transmitted on the multicast flow.

3. The method of claim 1, wherein a second multicast media is transmitted in the multicast flow as the first multicast media in the multicast flow.

4. The method of claim 1, wherein the indicator is multicast channel (MCH) scheduling information (MSI).

5. The method of claim 4, wherein waking from the sleep mode to monitor the indicator comprises:
checking a medium access control protocol data unit (MAC PDU) on every MSI to determine whether data is available for the first multicast media.

6. An apparatus for group communications over evolved multimedia broadcast/multicast services (E-MBMS), comprising:
logic configured to identify a schedule for an indicator on a broadcast/multicast medium of a first multicast media on a multicast flow, wherein the indicator is configured to identify a location of data on the broadcast/multicast medium and to identify a presence of the data on the multicast flow;
logic configured to bind application layer paging, an application layer wake up mechanism, or a power saving mechanism to the schedule for the indicator on the multicast flow;
logic configured to wake from a sleep mode to monitor the indicator to determine availability of the first multicast media based on the indicator, while maintaining an application layer sleep cycle;
logic configured to notify the application layer and tune to the first multicast media if the first multicast media is available; and
logic configured to return to the sleep mode without notifying the application layer to maintain the application layer sleep cycle if the first multicast media is not available.

7. The apparatus of claim 6, wherein media and signaling data for the first multicast media is multiplexed at the application layer and transmitted on the multicast flow.

8. The apparatus of claim 6, wherein a second multicast media is transmitted in the multicast flow as the first multicast media in the multicast flow.

9. The apparatus of claim 6, wherein the indicator is multicast channel (MCH) scheduling information (MSI).

10. The apparatus of claim 9, wherein the logic configured to wake from the sleep mode to monitor the indicator comprises:
logic configured to check a medium access control protocol data unit (MAC PDU) on every MSI to determine whether data is available for the first multicast media.

11. An apparatus for group communications over evolved multimedia broadcast/multicast services (E-MBMS), comprising:
means for identifying a schedule for an indicator on a broadcast/multicast medium of a first multicast media on a multicast flow, wherein the indicator is configured to identify a location of data on the broadcast/multicast medium and to identify a presence of the data on the multicast flow;
means for binding application layer paging, an application layer wake up mechanism, or a power saving mechanism to the schedule for the indicator on the multicast flow;
means for waking from a sleep mode to monitor the indicator to determine availability of the first multicast media based on the indicator, while maintaining an application layer sleep cycle;
means for notifying the application layer and tuning to the first multicast media if the first multicast media is available; and
means for returning to the sleep mode without notifying the application layer to maintain the application layer sleep cycle if the first multicast media is not available.

12. The apparatus of claim 11, wherein media and signaling data for the first multicast media is multiplexed at the application layer and transmitted on the multicast flow.

13. The apparatus of claim 11, wherein a second multicast media is transmitted in the multicast flow as the first multicast media in the multicast flow.

14. The apparatus of claim 11, wherein the indicator is multicast channel (MCH) scheduling information (MSI).

15. The apparatus of claim 14, wherein the means for waking from the sleep mode to monitor the indicator comprises:
means for checking a medium access control protocol data unit (MAC PDU) on every MSI to determine whether data is available for the first multicast media.

16. A non-transitory computer-readable medium storing instructions, which when executed by a computer, cause the computer to perform a method for group communications over evolved multimedia broadcast/multicast services (E-MBMS), the instructions comprising:
at least one instruction to identify a schedule for an indicator on a broadcast/multicast medium of a first multicast media on a multicast flow, wherein the indicator is configured to identify a location of data on the broadcast/multicast medium and to identify a presence of the data on the multicast flow;
at least one instruction to bind application layer paging, an application layer wake up mechanism, or a power saving mechanism to the schedule for the indicator on the multicast flow;
at least one instruction to wake from a sleep mode to monitor the indicator to determine availability of the first multicast media based on the indicator, while maintaining an application layer sleep cycle;
at least one instruction to notify the application layer and tune to the first multicast media if the first multicast media is available; and
at least one instruction to return to the sleep mode without notifying the application layer to maintain the application layer sleep cycle if the first multicast media is not available.

17. The non-transitory computer-readable medium of claim 16, wherein media and signaling data for the first multicast media is multiplexed at the application layer and transmitted on the multicast flow.

18. The non-transitory computer-readable medium of claim 16, wherein a second multicast media is transmitted in the multicast flow as the first multicast media in the multicast flow.

19. The non-transitory computer-readable medium of claim 16, wherein the indicator is multicast channel (MCH) scheduling information (MSI).

20. The non-transitory computer-readable medium of claim 19, wherein the at least one instruction to wake from the sleep mode to monitor the indicator comprises:
at least one instruction to check a medium access control protocol data unit (MAC PDU) on every MSI to determine whether data is available for the first multicast media.

* * * * *